3,480,536
ION SENSITIVE LANTHANUM-CERIUM CONTAINING GLASS ELECTRODE
Edwin P. Arthur, Fullerton, Calif., assignor to Beckman Instruments, Inc., a corporation of California
No Drawing. Filed Nov. 19, 1965, Ser. No. 508,865
Int. Cl. B01k 3/04, 3/10
U.S. Cl. 204—195                     2 Claims

ABSTRACT OF THE DISCLOSURE

A glass electrode having a low resistance, low sodium ion error glass membrane for hydrogen ion concentration measurements. The preferred membrane composition comprises, in mole percent, about 51.2 silica, 9.3 titanium dioxide, 26.3 lithia, 6.1 barium oxide, 2.7 lanthanum oxide and 4.4 cerium oxide.

---

This invention relates to an ion sensitive glass for use in electrodes for making hydrogen ion concentration measurements and, in particular, to a lithium-silicate hydrogen ion sensitive glass having both relatively low resistance and low sodium ion error.

Some of the most successful glass electrodes which have been utilized commercially for numerous years are those having barriers or bulbs formed of lithia-silicate glasses containing the stabilizers, barium oxide and lanthanum oxide, and in some cases cerium oxide, such glasses being described in detail in U.S. Patent No. 2,462,843 to Cary et al. and in U.S. Patent No. 2,668,143 to Gilbert et al. Glass electrodes having ion sensitive bulbs formed from these glasses have been used for widespread applications since they have a balance of desired characteristics, namely, ease of melting and forming into bulbs, relatively low sodium ion error, high resistance to shock and impact and, stability in air, water and other fluids including hot corrosive media.

It has been observed from an investigation of glass electrodes having bulbs formed of the aforementioned glasses that the sodium ion error, that is, the deviations of the electrodes from the theoretical hydrogen electrode behavior in solutions containing sodium ions, is an inverse function of the mol ratio of silica to lithia in the glasses. That is, the greater the ratio of silica to lithia in the glasses, the lower is the magnitude of the sodium ion error. However, as has been previously disclosed in copending patent application entitled Ion Sensitive Glass, Ser. No. 410,749, filed Nov. 12, 1964, assigned to the assignee of this application, now U.S. Patent No. 3,238,050, the electrical resistance of an alkali-silicate glass increases upon an increase of the mol ratio of silica to alkali. Since glass electrodes formed of glasses according to the teachings of Gilbert et al. contain a relatively large amount of silica in comparison to lithia, the electrodes have relatively low sodium ion error but relatively high electrical resistance. In contrast to the Gilbert et al. glasses, glass electrodes made in accordance with the teachings of Cary et al. having a relatively larger amount of lithia in comparison to silica have low electrical resistance but relatively high sodium ion error. It is, therefore, desired to provide a hydrogen ion sensitive glass having all the desired characteristics of the aforementioned glasses but with both low electrical resistance and low sodium ion error.

It is, therefore, the principal object of the present invention to provide a hydrogen ion sensitive glass for glass electrodes having both low sodium ion error and low electrical resistance.

According to the principal aspect of the present invention, it has been discovered that by replacing a portion of the silica by titanium dioxide in lithium-silicate glasses containing an alkaline earth metal oxide, an oxide of the lanthanide series and cerium oxide, the resultant glasses have, not only low sodium ion error, but also low electrical resistance. By substituting titanium dioxide for a portion of the silica in the above glasses, the ratio of lithia to silica is increased, thus resulting in the glasses having a lower resistance as would be expected. However, quite unexpectedly, and contrary to previous observations with respect to the effect of the silica to lithia ratio on sodium ion error, the glasses of the invention also have relatively low sodium ion error, thus providing in a single glass composition the desired characteristics of relatively low electrical resistance and low sodium ion error, with the glasses retaining essentially all the desired characteristics described in the Cary et al. patent.

Based upon the above discovery, it is concluded that titanium dioxide is electrochemically inert in the aforementioned glasses and, hence, has virtually no effect on the sodium ion error of the glasses, yet its inclusion in the glasses permits an increase in the lithia to silica ratio, thus lowering the resistance of the glasses. The substitution of a portion of the silica by titanium dioxide in the present invention is not to be confused with the use of titanium dioxide to render glasses reworkable since in this invention the titanium dioxide does not render the glasses reworkable. But, surprisingly, its use results in the glasses having low electrical resistance besides low sodium ion error.

The most useful composition of glasses in accordance with the invention are those containing, in mol percent calculated from the prefusion mixture, about 50 to 60 silica, about 4 to 10 titanium dioxide, about 24 to 30 lithia, with the remainder being a combination of the following stabilizers: an akaline earth metal oxide, an oxide of the lanthanide series and cerium oxide, in the ratio of about 5:2:3. The alkaline earth metal oxide may be either barium oxide, calcium oxide or strontium oxide. Any one of the oxides of the lanthanide series may be used but, preferably, the glass of the invention incorporates lanthanum oxide.

The glasses of the invention may be produced from conventional glassmaking batch ingredients by using conventional glassmaking techniques. The ingredients may be in the carbonate, nitrate, oxide or hydroxide form, the only requirement being that they will yield the appropriate oxide-bearing glass upon fusion. The batch ingredients, for example, may include silica sand, lithium carbonate, lanthanum oxide or lanthanum carbonate, barium oxide when barium is desired as the alkaline earth metal, and cerium dioxide. The batch ingredients of the glasses are thoroughly mixed together, then introduced into a refractory crucible and heated until molten. The molten magma is maintained at an elevated temperature for sufficient time to yield a bubble-free glass. From this glass, electrode bulbs can be blown by the process disclosed in U.S. Patent No. 2,346,470 to Cary et al., or by other processes known in the art.

Reference is made to the following table for a more ready understanding of the invention:

| Glass No. | SiO₂ | TiO₂ | Li₂O | BaO | La₂O₃ | CeO₂ | Ratio SiO₂/Li₂O | R | SIE |
|---|---|---|---|---|---|---|---|---|---|
| 1 | 66.0 |  | 30.0 | 2.0 | 2.0 |  | 2.20 | 25 | 21 |
| 2 | 61.5 |  | 24.5 | 7.0 | 2.5 | 4.5 | 2.50 | 750 | (¹) |
| 3 | 61.1 |  | 25.4 | 6.1 | 2.6 | 4.8 | 2.40 | 500 | 7 |
| 4 | 56.6 | 4.6 | 25.9 | 6.0 | 2.5 | 4.4 | 2.18 | 250 | 8 |
| 5 | 51.2 | 9.3 | 26.3 | 6.1 | 2.7 | 4.4 | 1.95 | 150 | 7(3) |

¹ Refer to text for explanation.

The above table disclosed five glasses the compositions of which are expressed in terms of mol percent as calculated from the prefusion mixture of the ingredients making up the glasses. In the last three columns of the table, for each of the glasses there is indicated the ratio of the silica to lithia, the resistance, R, of an 11 millimeter bulb formed of each glass, expressed in megohms at 23½° C.; and the sodium ion error, SIE, of glass electrodes incorporating bulbs having the compositions indicated in the table. The sodium ion response was determined by contacting two different solutions, .01 normal and 0.1 normal sodium concentration in pH 12.45 buffer solutions at about 23½° C., with each glass electrode and a standard reference electrode, the two electrodes being connected to a conventional high impedance potentiometer as normally used in pH measurements. The ionic concentration of the solutions was measured by measuring the potential developed between each glass electrode and reference half cell as indicated by the high impedance potentiometers, the difference in millivolt readings of the electrode pair in each solution being listed under the column headed SIE in the table. It can be appreciated that if the glass electrodes were completely insensitive to sodium ions, that is, have no sodium ion error, the millivolt output of the electrode pair in each solution would be the same and the difference between the millivolt readings would be zero.

Glass No. 1 in the table is a glass having a composition similar to that taught in U.S. Patent No. 2,462,843. It is noted that in this glass, the ratio of lithia to silica is relatively high with a resultant low electrical resistance of 25 megohms. However, the sodium ion error of an electrode having a bulb formed of Glass No. 1 is relatively high at the high pH level of 12.45. Glasses Nos. 2 and 3 are compositions made generally in accordance with the teachings of the aforementioned Gilbert et al. patent in which the ratio of silica to lithia is greater than that for Glass No. 1, with a resultant substantially higher electrical resistance of 500 and 750 megohms. However, since the silica to lithia ratio is greater for Glasses Nos. 2 and 3 than for Glass No. 1, the sodium ion error is substantially less, being only 7 millivolts for Glass No. 3. No sodium ion error figure is provided for Glass No. 2 in the table inasmuch as Glass No. 2, having such substantially high electrical resistance, cannot conveniently be used at 23½° C. to make a pH measurement with the potentiometer that was used for the tests from which the data in the table was obtained. The cerium oxide contained in Glasses Nos. 2 and 3 enhances the workability characteristics of the glasses and make them more chemically durable and therefore more suitable for use in hot corrosive media. From the above data with respect to Glasses Nos. 1, 2 and 3, the previously mentioned observations are confirmed that the electrical resistance of the glasses decrease with a decrease in the silica to lithia ratio, but the sodium ion error increases.

Glasses Nos. 4 and 5 in the table are examples of two compositions made in accordance with the present invention, in which a portion of the silica of glasses similar to Glasses Nos. 2 and 3 is replaced by titanium dioxide, thus decreasing the silica to lithia ratio and, hence, decreasing the electrical resistance of the glasses. But, contrary to what would be expected from the observations with respect to Glass No. 1, the sodium ion error in Glasses Nos. 4 and 5 remains about the same as Glasses Nos. 2 and 3. The preferred glass is Glass No. 5 which has an electrical resistance of only 150 megohms and, electrodes from two different batches of Glass No. 5, had sodium ion errors of 7 and 3 millivolts, respectively, the lower value being attributed to the use of more nearly pure constituents in the prefusion mixture. Thus, by the present invention glasses are provided for pH glass electrodes having both low sodium ion error and relatively low resistance, besides being readily melted and worked into commercial electrodes, being highly stable and resistant to corrosive media.

As indicated previously, the range of silica for the glasses of the invention may be about 50 to 60 mol percent. Beyond these ranges of silica, the glasses tend to devitrify and thus are unsuitable for forming into thin barriers or bulbs. If the titanium dioxide exceeds 10 mol percent, the viscosity of the melt is found to be too low to gather a fully satisfactory gob on a stem to form a bulb therefrom. Less than 4 mol percent titanium dioxide would not sufficiently alter the lithia to silica ratio to lower the electrical resistance of the glass to a desired level. More than 30 mol percent of lithia results in glasses being nearly water soluble and, therefore, unsuitable for commercial electrodes, whereas glasses containing less than 24 mol percent lithia will have a silica to lithia too great to produce the desired low electrical resistance.

What is claimed is:

1. A glass electrode for hydrogen ion concentration measurements, said electrode including a membrane having an electrical resistance of no greater than about 250 megohms and said electrode exhibiting a differential response of no greater than about 8 millivolts when contacting two pH 12.45 buffer solutions having .01 N and 0.1 N sodium ion concentrations, respectively, said membrane having a composition, in mole percent calculated from the prefusion mixture, consisting essentially of about 56.6 silica, 4.6 titanium dioxide, 25.9 lithia, 6.0 barium oxide, 2.5 lanthanum oxide and 4.4 cerium oxide.

2. A glass electrode for hydrogen ion concentration measurements, said electrode including a membrane having an electrical resistance of no greater than about 150 megohms and said electrode exhibiting a differential response of no greater than about 7 millivolts when contacting two pH 12.45 buffer solutions having a .01 N and 0.1 N sodium ion concentrations, respectively, said membrane having a composition, in mole percent calculated from the prefusion mixture, consisting essentially of about 51.2 silica, 9.3 titanium dioxide, 26.3 lithia, 6.1 barium oxide, 2.7 lanthanum oxide and 4.4 cerium oxide.

References Cited

UNITED STATES PATENTS

| | | | |
|---|---|---|---|
| 2,497,235 | 2/1950 | Perley | 106—52 X |
| 2,668,143 | 2/1954 | Gilbert et al. | 106—52 X |
| 3,032,429 | 5/1962 | Arthur | 106—52 |
| 3,238,050 | 3/1966 | Arthur et al. | 106—52 |

HELEN M. McCARTHY, Primary Examiner

W. R. SATTERFIELD, Assistant Examiner

U.S. Cl. X.R.

106—47, 52; 204—1.1; 252—521